United States Patent
Fukuzawa

(10) Patent No.: US 9,249,281 B2
(45) Date of Patent: Feb. 2, 2016

(54) POLYOLEFIN RESIN FOAM PARTICLES AND IN-MOLD FOAMING MOLDED BODY OF SAME

(75) Inventor: Jun Fukuzawa, Settsu (JP)

(73) Assignee: KANEKA CORPORATION, Osaka-Shi (JP)

(*) Notice: Subject to any disclaimer, the term of this patent is extended or adjusted under 35 U.S.C. 154(b) by 161 days.

(21) Appl. No.: 14/237,491

(22) PCT Filed: Aug. 8, 2012

(86) PCT No.: PCT/JP2012/070275
§ 371 (c)(1),
(2), (4) Date: Feb. 6, 2014

(87) PCT Pub. No.: WO2013/022049
PCT Pub. Date: Feb. 14, 2013

(65) Prior Publication Data
US 2014/0171534 A1    Jun. 19, 2014

(30) Foreign Application Priority Data
Aug. 9, 2011    (JP) ................................. 2011-173633

(51) Int. Cl.
| | | |
|---|---|---|
| *C08J 9/16* | (2006.01) | |
| *C08J 9/18* | (2006.01) | |
| *C08J 9/228* | (2006.01) | |
| *C08K 5/49* | (2006.01) | |
| *C08K 5/5397* | (2006.01) | |
| *C08J 9/00* | (2006.01) | |
| *B29C 44/34* | (2006.01) | |
| *C08K 3/04* | (2006.01) | |
| *C08J 9/12* | (2006.01) | |
| *C08J 9/232* | (2006.01) | |
| *C08L 23/10* | (2006.01) | |
| *C08L 23/16* | (2006.01) | |

(52) U.S. Cl.
CPC ............ *C08K 5/5397* (2013.01); *B29C 44/3415* (2013.01); *B29C 44/3461* (2013.01); *C08J 9/008* (2013.01); *C08J 9/0028* (2013.01); *C08J 9/0038* (2013.01); *C08J 9/0061* (2013.01); *C08J 9/0095* (2013.01); *C08J 9/122* (2013.01); *C08J 9/125* (2013.01); *C08J 9/18* (2013.01); *C08J 9/232* (2013.01); *C08K 3/04* (2013.01); *C08L 23/10* (2013.01); *C08L 23/16* (2013.01); *C08J 2201/034* (2013.01); *C08J 2203/06* (2013.01); *C08J 2203/10* (2013.01); *C08J 2203/182* (2013.01); *C08J 2205/052* (2013.01); *C08J 2323/10* (2013.01); *C08J 2323/16* (2013.01); *C08J 2471/02* (2013.01); *C08L 2203/14* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 4,772,642 A | 9/1988 | Staendeke | |
| 5,569,681 A | 10/1996 | Tokoro et al. | |
| 2003/0105194 A1 | 6/2003 | Stuart et al. | |
| 2004/0171708 A1 | 9/2004 | Yoshizawa et al. | |
| 2008/0058435 A1 | 3/2008 | Allmendinger et al. | |
| 2012/0037837 A1* | 2/2012 | Itoi ....................... | C08J 9/0028 252/62 |
| 2012/0264837 A1* | 10/2012 | Eberstaller ............ | C08J 9/0033 521/85 |

FOREIGN PATENT DOCUMENTS

| | | | |
|---|---|---|---|
| JP | 61-204250 A | 9/1986 | |
| JP | 7-258447 A | 10/1995 | |
| JP | 7-309967 A | 11/1995 | |
| JP | 9-227711 A | 9/1997 | |
| JP | 10-147661 A | 6/1998 | |
| JP | 2000-302908 A | 10/2000 | |
| JP | 2004-263033 A | 9/2004 | |
| WO | WO 03/048239 A1 | 6/2003 | |
| WO | WO 2010/119670 A1 | 10/2004 | |
| WO | WO 2011/035357 A1 | 3/2011 | |
| WO | WO 2012028953 A1 * | 3/2012 | ............ C08L 23/02 |

OTHER PUBLICATIONS

International Search Report, mailed Oct. 16, 2012, issued in PCT/JP2012/070275.
Written Opinion of the International Searching Authority, mailed Oct. 16, 2012, issued in PCT/JP2012/070275.
English translation of International Preliminary Report on Patentability and Written Opinion mailed Feb. 20, 2014, in PCT International Application No. PCT/JP2012/070275.
Notification of First Office Action issued Oct. 29, 2014, in Chinese Patent Application No. 201280038293.1, with English translation.

* cited by examiner

*Primary Examiner* — Kara Boyle
(74) *Attorney, Agent, or Firm* — Birch, Stewart, Kolasch & Birch, LLP

(57) ABSTRACT

In order to obtain a flame-retardant polyolefin resin expanding molded product which has excellent in-mold moldability and excellent surface appearance and satisfies the FMVSS flammability even if carbon black is added, polyolefin resin particles containing, with respect to 100 parts by weight of polyolefin resin, (i) 0.03 part by weight to 5 parts by weight of phosphorous flame retardant having a phosphorous content of 7% by weight or more, a melting point of 120° C. or more, and a 5% by weight decomposition temperature within a range of 240° C. to 320° C. and (ii) 0.5 part by weight to 20 parts by weight of carbon black are expanded.

7 Claims, 2 Drawing Sheets

1

POLYOLEFIN RESIN FOAM PARTICLES AND IN-MOLD FOAMING MOLDED BODY OF SAME

TECHNICAL FIELD

The present invention relates to polyolefin resin expanded particles having improved flame retardancy and to flame retardant polyolefin-resin-expanded-particle molded product produced by fusing the polyolefin resin expanded particles with each other.

BACKGROUND ART

In-mold expanding molded products, which are produced by (i) introducing, into a mold for in-mold expanding molding, polyolefin resin expanded particles that have been produced by expanding polyolefin resin particles and (ii) fusing the polyolefin resin expanded particles by heating, are used in various ways such as packaging materials, buffer materials, heat insulators, building materials, and automobile materials.

In some fields such as building materials and automobile materials among those uses, in-mold expanding molded products are required to have flame retardancy. Therefore, there are proposed polypropylene resin expanded particles made from resin containing a flame retardant and a flame retardant aid as necessary and in-mold expanding molded products made from the polypropylene resin expanded particles (see, for example, Patent Literatures 1 and 2).

Colored polyolefin resin expanded particles or in-mold expanding molded products made from the colored polyolefin resin expanded particles are demanded in some cases in view of appearance. Particularly in the field of automobile parts etc., black-colored polyolefin resin expanded particles or black-colored in-mold expanding molded products are demanded, and carbon black is generally used as a black pigment for in-mold expanding molded products because of its tinting strength, heat resistance, etc.

Meanwhile, weight reduction of those materials have been carried out in recent years, and requests for expanding molded products having a high expanding ratio have been increased accordingly.

Automobile interior part materials etc. usually must satisfy flammability standards, and there are therefore demands for flame-retardant materials or materials having a slow flame velocity. However, in-mold expanding molded products in which carbon black is used and in-mold expanding molded products having a high expanding ratio tend to be flammable. Therefore, in many cases, black in-mold expanding molded products having a high expanding ratio cannot satisfy the flammability standards.

Various methods of preparing nonflammable polyolefin resin which is originally flammable are examined, and addition of a flame retardant is a general method. As the flame retardant added to polyolefin resin, the following various flame retardants are used: halogen-containing compounds, hydrated metal oxides, phosphate esters, and nitrogen-containing compounds, and such examples of flame retardants used for polyolefin resin expanding bodies are disclosed in Patent Literatures 1 to 3 typically. In recent years, non-halogen flame retardants are preferably used because of, for example, an environmental problem that halogen-containing compounds may generate a harmful gas at the time of combustion. In addition, those non-halogen flame retardants are used in large amounts for resin, which may cause reduction in mechanical properties and deterioration of moldability.

Further, in recent years, sterically hindered amine ether flame retardants are proposed to be used as non-halogen flame retardants for polypropylene resin in-mold expanding molded products (see Patent Literatures 4 and 5). However, in a case where sterically hindered amine ether flame retardants are used in polypropylene resin in-mold expanding molded products containing carbon black, the sterically hindered amine ether flame retardants have insufficient flame retardancy in some cases. Those organic compound molecule type flame retardants are extremely expensive, but may have a low heat resistance, and may limit process conditions.

The step of molding polyolefin resin expanded particles into a polyolefin resin in-mold expanding molded product is also carried out as follows in many cases: air is pressurized in the polyolefin resin expanded particles in advance in a pressure-resistant vessel to impregnate air to the polyolefin resin expanded particles, thereby imparting an expandability; an in-mold expanding molding apparatus is filled with the polyolefin resin expanded particles; and the polyolefin resin expanded particles are heated with use of heated steam.

In actual production, however, change in internal pressure of polyolefin resin expanded particles because of air impregnation, reduction of the internal pressure after removal of the polyolefin resin expanded particles from the pressure-resistant vessel but before introduction of the polyolefin resin expanded particles into the in-mold molding apparatus, and variation of the internal pressure of the polyolefin resin expanded particles occur in some cases. It was found that the internal pressure of the polyolefin resin expanded particles is extremely decreased depending on which kind of flame retardant is used with the polyolefin resin expanded particles, which easily results in generation of wrinkle on a surface of a molded product thus produced and in occurrence of gaps between the polyolefin resin expanded particles. Accordingly, even if the internal pressure of the expanded particles varies, a favorable molded product is desirably produced.

CITATION LIST

Patent Literatures

Patent Literature 1
Japanese Patent Application Publication, Tokukaihei, No. 7-309967 A (Publication date: Nov. 28, 1995)
Patent Literature 2
Japanese Patent Application Publication, Tokukaihei, No. 10-147661 A (Publication date: Jun. 2, 1998)
Patent Literature 3
Japanese Patent Application Publication, Tokukaihei, No. 7-258447 A (Publication date: Oct. 9, 1995)
Patent Literature 4
International publication WO 2003/048239 (Publication date: Jun. 12, 2003)
Patent Literature 5
Japanese Patent Application Publication, Tokukai, No. 2004-263033 A (Publication date: Sep. 24, 2004)

SUMMARY OF INVENTION

Technical Problem

While a flame-retardancy level required for in-mold expanding molded products differs depending on the use thereof, in order to produce a polyolefin resin in-mold expanding molded product whose color is black suitably used for automobile parts, which does not lose in-mold moldability, surface appearance, etc., and which is nonflammable in comparison with conventional in-mold expanding molded products, an object of the present invention is to provide flame-retardant polyolefin resin expanded particles containing an inexpensive flame retardant.

In particular, in a case where carbon black is used to produce black-colored polyolefin resin expanded particles and black-colored in-mold expanding molded products, development of black is improved by using carbon black having a fine particle diameter, however, the use of this carbon black tends to decrease flame retardancy, and therefore it is necessary to use a large amount of expensive flame retardant. Further, depending on the kind of flame retardant, a range of an internal pressure of expanded particles to be used to produce a molded product having a sufficient surface is reduced, and therefore a molding loss is easily generated, which results in reduction of productivity.

Solution to Problem

The inventors of the present invention had diligently examined in view of the above problems, and, as a result, the inventors found that a flame-retardant polyolefin resin in-mold expanding molded product containing a specific amount of carbon black, which was nonflammable in comparison with conventional products, could be obtained inexpensively by using polyolefin resin expanded particles made from polyolefin resin containing a specific phosphorous-based substance, and also found that molding conditions at the time of in-mold molding can be wide-ranged by the use of the polyolefin resin expanded particles and loss at the time of production of the products could be reduced.

That is, the present invention firstly relates to polyolefin resin expanded particles obtainable by expanding polyolefin resin particles which contains, with respect to 100 parts by weight of polyolefin resin, (i) 0.03 part by weight to 5 parts by weight of a phosphorous flame retardant having a phosphorous content of 7% by weight or more, a melting point of 120° C. or more, and a 5% by weight decomposition temperature within a range of 240° C. to 320° C. and (ii) 0.5 part by weight to 20 parts by weight of carbon black.

The present invention secondly relates to a method of producing polyolefin resin expanded particles including the steps of: dispersing polyolefin resin particles in a dispersion medium inside a closed vessel, heating the polyolefin resin particles to a temperature equal to or higher than a softening temperature of the polyolefin resin particles in the presence of expanding agent; and expanding the polyolefin resin particles by discharging the polyolefin resin particles together with the dispersion medium to an atmosphere having a pressure of less than a pressure in the closed vessel, the polyolefin resin particles containing, (i) 0.03 part by weight to 5 parts by weight of a phosphorous flame retardant having a phosphorous content of 7% by weight or more, a melting point of 120° C. or more, and a 5% by weight decomposition temperature within a range of 240° C. to 320° C. and (ii) 0.5 part by weight to 20 parts by weight of carbon black.

Advantageous Effects of Invention

In an FMVSS302 flammability test, an in-mold expanding molded product made from polyolefin resin expanded particles of the present invention exhibits satisfactory flame retardancy even if the in-mold expanding molded product contains no or a small amount of sterically hindered amine ether flame retardant, and, in terms of appearance of the molded product, color irregularities or wrinkles do not occur even if an internal pressure imparted to expanded particles for use in in-mold molding is changed.

DESCRIPTION OF EMBODIMENTS

Figure 1:
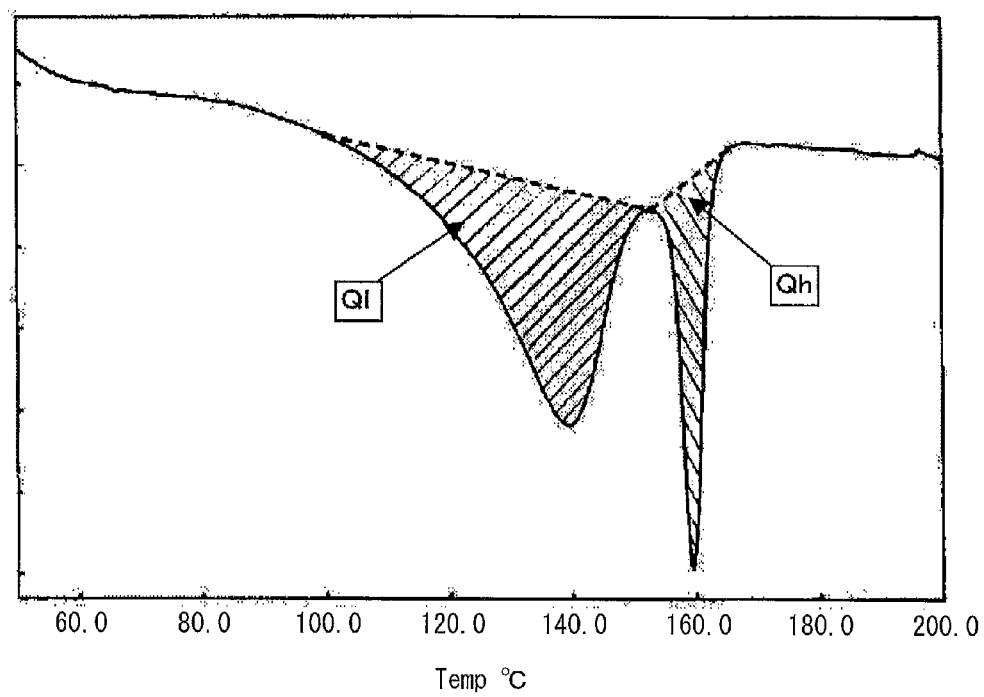
FIG. 1 shows an example DSC curve which can be obtained when polyolefin resin expanded particles of the present invention are heated from 40° C. to 220° C. at a rate of 10° C./minute with use of a differential scanning calorimeter (DSC). Ql is a quantity of heat at a melting peak on a lower temperature side, which quantity of heat is represented by an area enclosed by (i) the melting peak on the lower temperature side and (ii) a tangent extending, to a baseline from which melting starts, from a maximum point between the melting peak on the lower temperature side and a melting peak on a higher temperature side, and Qh is a quantity of heat at the melting peak on the higher temperature side, which quantity of heat is represented by an area enclosed by (i) the melting peak on the higher temperature side and (ii) a tangent extending, to a baseline at which the melting ends, from the maximum point between the melting peak on the lower temperature side and the melting peak on the higher temperature side.

Polyolefin resin expanded particles of the present invention is obtainable by expanding polyolefin resin particles which contains, with respect to 100 parts by weight of polyolefin resin, (i) 0.03 part by weight to 5 parts by weight of a phosphorous flame retardant having a phosphorous content of 7% by weight or more, a melting point of 120° C. or more, and a 5% by weight decomposition temperature within a range of 240° C. to 320° C. and (ii) 0.5 part by weight to 20 parts by weight of carbon black. Therefore, it is possible to produce an in-mold expanding molded product exhibiting favorable flame retardancy in the FMVSS302 flammability test method and having excellent appearance.

Polyolefin resin for use in the present invention is a polymer containing 75% by weight or more but 100% by weight or less of olefin monomer, and preferably 80% by weight or more but 100% by weight or less of olefin monomer. Polyolefin resin for use in the present invention may contain 25% by weight or less, and preferably 20% by weight or less of another monomer copolymerizable with the olefin monomer.

Specific examples of olefin monomer encompass $C_2$ to $C_{12}$ α-olefins such as ethylene, propylene, butene-1, isobutene, pentene-1,3-methyl-butene-1, hexene-1,4-methyl-pentene-1,3,4-dimethyl-butene-1, heptene-1,3-methyl-hexene-1, octene-1, and decene-1. Those olefin monomers may be used solely, or two or more kinds thereof may be used in combination.

Specific examples of another monomer copolymerizable with an olefin monomer encompass: cyclic olefins such as cyclopentene, norbornene, and 1,4,5,8-dimethano-1,2,3,4,4a,8,8a,6-octahydronaphthalenes; and dienes such as 5-methylene-2-norbornene, 5-ethylidene-2-norbornene, 1,4-hexadiene, methyl-1,4-hexadiene, and 7-methyl-1,6-octadiene. Those monomers may be used solely, or two or more kinds thereof may be used in combination.

Specific examples of olefin resin encompass: polyethylene resins mainly containing ethylene such as high density polyethylene, medium density polyethylene, low density polyethylene, and linear low density polyethylene; and polypropylene resin mainly containing propylene. Those polyolefin resins may be used solely, or two or more kinds thereof may be used in combination.

Among those, polypropylene resin is preferably used as polyolefin resin because it is easy to produce polypropylene resin expanded particles having a low expanding ratio to a high expanding ratio and an in-mold molded product made from polypropylene resin can have a high strength.

Polypropylene resin is not particularly limited provided that it contains propylene as a main component of a monomer, and, examples of polypropylene resin encompass propylene homopolymer, α-olefin-propylene random copolymer, and α-olefin-propylene block copolymer. Those polypropylene resins may be used solely, or two or more kinds thereof may be used in combination. Among those, polypropylene resin containing α-olefin which is ethylene as a copolymerization monomer component is preferable because the polypropylene resin can be in-mold molded under a low steam pressure.

An ethylene content of polypropylene resin is preferably 1% by weight or more but 10% by weight or less, more preferably 2% by weight or more but 7% by weight or less, further preferably 3.5% by weight or more but 6% by weight or less, and particularly preferably 3.5% by weight or more 5% by weight or less.

Note that an ethylene content of a copolymerization monomer component in polypropylene resin can be measured with use of 13C-NMR.

Polypropylene resin for use in the present invention has a melting point of preferably 130° C. or more but 165° C. or less, and more preferably 135° C. or more but 155° C. or less. If a melting point of polypropylene resin is less than 130° C., a heat resistance and a mechanical strength tend to be insufficient. Meanwhile, if the melting point exceeds 165° C., polypropylene resin cannot easily obtain fusability at the time of in-mold expanding molding by a bead method in many cases.

Here, the melting point of polypropylene resin means a peak temperature of an endothermic peak in a DSC curve obtained with use of a differential scanning calorimeter by heating 1 mg to 10 mg of polypropylene resin from 40° C. to 220° C. at a rate of 10° C./minute, cooling the polypropylene resin to 40° C. at the rate of 10° C./minute, and then heating again the polypropylene resin to 220° C. at the rate of 10° C./minute.

Polypropylene resin for use in the present invention has a melt flow rate (hereinafter, referred to as "MFR") of preferably 0.5 g/10 minutes or more but 30 g/10 minutes or less, and more preferably 2 g/10 minutes or more but 20 g/10 minutes or less. If the MFR of polypropylene resin is less than 0.5 g/10 minutes, polypropylene resin pre-expanded particles having a high expanding ratio cannot be easily produced in some cases, meanwhile, if the MFR exceeds 30 g/10 minutes, cells of polypropylene resin pre-expanded particles tend to be easily broken and an open-cell ratio of polypropylene resin pre-expanded particles tends to be high.

Here, the MFR of polypropylene resin is a value which is measured at a temperature of 230° C. and under a load of 2.16 kg in conformity with JIS K7210.

While a ratio (Mw/Mn) of weight-average molecular weight (hereinafter, referred also to as "Mw") to number-average molecular weight (hereinafter, referred also to as "Mn") of polypropylene resin for use in the present invention is not particularly limited, preferably the ratio is 3.0 or more, and more preferably the ratio is 3.0 or more but 6.0 or less.

Mn and Mw are measured under conditions below.
Measurement device: Alliance GPC type-2000 gel permeation chromatography (GPC) manufactured by Waters Corporation
Column: Two TSK gel GMH6-HT
    Two TSK gel GMH6-HTL (both have inner diameter 7.5 mm×length 300 mm, manufactured by TOSOH CORPORATION)
Mobile phase: O-dichlorobenzene (containing 0.025% of BHT)
Column temperature: 140° C.
Flow rate: 1.0 mL/min
Sample concentration: 0.15%(W/V)-o-dichlorobenzene
Injection amount: 500 μL
Molecular weight calibration: Polystyrene basis (calibration based on standard polystyrene)

Examples of polyethylene resin for use in the present invention encompass ethylene homopolymer, ethylene-α-olefin random copolymer, ethylene-α-olefin block copolymer, low density polyethylene, high density polyethylene, and linear low density polyethylene.

Note that examples of α-olefins encompass $C_3$ to $C_{15}$ α-olefins, and those α-olefins may be used solely, or two or more kinds thereof may be used in combination.

Among those polyethylene resins, polyethylene resin which is an ethylene-α-olefin block copolymer and has 1% by weight to 10% by weight of a content of comonomer other than ethylene or polyethylene resin which is linear low density polyethylene exhibits sufficient expandability and can be used favorably.

The melting point of polyethylene resin for use in the present invention is preferably 110° C. or more but 140° C. or less, and more preferably 120° C. or more but 130° C. or less because the above temperatures contribute to produce pre-expanded particles which (i) have excellent expandability and moldability and (ii) exhibit an excellent mechanical strength and heat resistance when the particles are used to produce a polyolefin resin in-mold expanding molded product.

The MFR of polyethylene resin for use in the present invention is preferably 0.5 g/10 minutes or more but 30 g/10 minutes or less, more preferably 1 g/10 minutes or more but 5 g/10 minutes or less, and particularly preferably 1.5 g/10 minutes or more but 2.5 g/10 minutes or less.

If the MFR of polyethylene resin is less than 0.5 g/10 minutes, there is a tendency that pre-expanded particles having a high expanding ratio cannot be easily produced and cells are uneven. Meanwhile, in a case where the MFR of polyethylene resin exceeds 30 g/10 minutes, polyethylene resin are easily expanded, however, cells are easily broken, and there is a tendency that the open-cell ratio of pre-expanded particles is increased and the cells are uneven.

Here, the MFR of polyethylene resin is a value which is measured at a temperature of 190° C. and under a load of 2.16 kg in conformity with JIS K7210.

Polyolefin resin for use in the present invention may be polyolefin resin in which multiple kinds of polyolefin resins are mixed as necessary, or may be polyolefin resin in combination with another thermoplastic resin which is usable with polyolefin resin such as polystyrene and ionomer, provided that polyolefin resin does not lose its properties.

Polyolefin resin for use in the present invention can be produced with use of a catalyst such as a Ziegler catalyst, a metallocene catalyst, and a post-metallocene catalyst.

In a case of using a Ziegler catalyst, the resultant polymer tends to have a large Mw/Mn.

In the present invention, it is possible to adjust properties such as a molecular weight and an MFR by subjecting a polymer produced with use of those catalysts to oxidative decomposition with an organic peroxide.

Examples of organic peroxide for use in the present invention encompass 1,1-bis(t-butylperoxy)3,3,5-trimethyl cyclohexane, t-butylperoxylaurate, 2,5-dimethyl 2,5-di(benzoyl peroxy)hexane, t-butyl peroxy benzoate, dicumyl peroxide, 1,3-bis(t-butylperoxy isopropyl)benzene, and t-butyl peroxy-isopropylmonocarbonate.

In a case where an organic peroxide is used, an amount of organic peroxide used is preferably 0.001 part by weight or more but 0.1 part by weight or less with respect to 100 parts by weight of polyolefin resin. The oxidative decomposition of polyolefin resin can be carried out by heating and melting, in an extruder, polyolefin resin to which an organic peroxide has been added, for example.

Polyolefin resin of the present invention is preferably non-crosslinked, however, may be crosslinked by processing polyolefin resin with use of an organic peroxide, radiation, or the like.

In the present invention, because polyolefin resin particles contain a phosphorous flame retardant whose melting point is 120° C. or more, a phosphorous content is 7% by weight or more, and 5% by weight decomposition temperature falls within a range of 240° C. to 320° C., it is possible to produce polyolefin resin expanded particles and in-mold molded products, each of which (i) exhibits high flame retardancy, (ii) has excellent fusability between the expanded particles at the time of in-mold molding, and (iii) has an excellent surface appearance.

The phosphorous flame retardant for use in the present invention has a melting point of preferably 120° C. or more in terms of thermal stability of the resultant expanded product and an extrusion operability.

If the melting point of phosphorous flame retardant is less than 120° C., there is a tendency that the extrusion operability is deteriorated and the thermal stability of the resultant expanded product is also deteriorated.

The phosphorous flame retardant for use in the present invention has a phosphorous content of preferably 7% by weight or more per one molecule in terms of the thermal stability and the flame retardancy of the resultant expanded product.

If the phosphorous content of the phosphorous flame retardant is less than 7% by weight, a flame-retardance capability of the resultant expanded product is insufficient, and increase in number of parts added to ensure a high flame-retardance capability tends to reduce the thermal stability of the resultant expanded product.

The phosphorous flame retardant for use in the present invention has the 5% by weight decomposition temperature of preferably 240° C. to 320° C. because shapes of the particles and weights of the particles are uniform when the polyolefin resin particles are produced by an extruder and a molded product produced by in-mold molding the resultant expanded particles has excellent flame retardancy, and more preferably 240° C. to 300° C.

If the 5% by weight decomposition temperature of the phosphorous flame retardant is less than 240° C., there is a tendency that the phosphorous flame retardant is easily decomposed in the extruder and the extrusion operability is lost, or that flame retardancy of the resultant molded product is deteriorated. Meanwhile, if the 5% by weight decomposition temperature exceeds 320° C., a flame retardancy improvement effect tends to be small.

Here, a 5% by weight decomposition temperature is a temperature when a sample of 5 mg is measured at a heating rate of 10° C./min in an air atmosphere with use of a TG-DTA analysis device [e.g., DTG-60A manufactured by Shimadzu Corporation].

The phosphorous flame retardant of the present invention whose melting point is 120° C. or more, phosphorous content is 7% by weight or more, and 5% by weight decomposition temperature is 240° C. to 320° C. is, for example, triphenylphosphine oxide or 2-diphenyl phosphinyl hydroquinone. Among those, a triphenylphosphine oxide is preferable in terms of a flame-retardance capability, price, and availability.

In polyolefin resin particles of the present invention, the phosphorous flame retardant having the melting point of 120° C. or more, the phosphorous content of 7% by weight or more, and the 5% by weight decomposition temperature of 240° C. to 320° C. is contained preferably in an amount of 0.03 part by weight to 5 parts by weight with respect to 100 parts by weight of polyolefin resin, and more preferably in the amount of 0.03 part by weight to 2 parts.

If the phosphorous flame retardant content is less than 0.03 part by weight, a flame-retardant effect may be insufficient, meanwhile, if the phosphorous flame retardant content exceeds 5 parts by weight, the thermal stability of the resultant expanded product tends to be deteriorated.

In polyolefin resin expanded particles of the present invention, the polyolefin resin particles contain carbon black in order to produce a black molded product.

Specific examples of carbon black for use in the present invention encompass channel black, roller black, disk, gas furnace black, oil furnace black, thermal black, and acetylene black. Those may be used solely, or two or more kinds thereof may be used in combination.

A carbon black content of polyolefin resin particles of the present invention is preferably 0.5 part by weight or more but 20 parts by weight or less with respect to 100 parts by weight of polyolefin resin particles, and more preferably 1 part by weight or more but 10 parts by weight or less.

If the carbon black content is less than 0.5 part by weight, polyolefin resin particles are not easily colored by black in many cases, meanwhile, if the carbon black content exceeds 20 parts by weight, cell diameters of the resultant polyolefin resin expanded particles tend to be extremely small, thereby deteriorating in-mold expanding moldability (particularly, surface appearance), and to exhibit insufficient flame retardancy.

In a case where resin particles containing carbon black are prepared in the present invention, carbon black is preferably melted and kneaded with polyolefin resin in the form of polyolefin resin (hereinafter, referred to as "carbon black masterbatch") in which carbon black is dispersed.

Examples of polyolefin resin for use in the carbon black masterbatch encompass polyethylene resin and polypropylene resin.

While examples of polypropylene resin are the resins cited above, polypropylene resin having an MFR of 10 g/10 minutes or more is preferably used because it is easily possible to produce masterbatch.

A carbon black concentration of the carbon black masterbatch is preferably 5% by weight or more but 60% by weight or less, and more preferably 20% by weight or more but 50% by weight or less.

A stabilizer and/or a lubricant may be added to the carbon black masterbatch.

The carbon black masterbatch can be produced by melting and kneading polyolefin resin and carbon black with use of an extruder, a kneader, a Banbury mixer, a roller, or the like. In particular the extruder is preferably used.

A degree of black is improved by dispersing carbon black of the carbon black masterbatch into resin as much as possible, so that, in a case where carbon black is used as a coloring agent, an aggregate and an agglomerate thereof are usually adjusted to be small.

In polyolefin resin expanded particles of the present invention, carbon black has an average primary particle diameter of preferably 10 nm or more but 200 nm or less, and more preferably 30 nm or more but 100 nm or less.

In a case where polyolefin resin particles of the present invention contain a sterically hindered amine ether flame retardant, the polyolefin resin particles can obtain target flame retardancy with a small amount of flame retardant added.

A preferable example of the sterically hindered amine ether flame retardant is a compound represented by the following general formula (1):

[Chem. 1]

$$R^1NHCH_2CH_2CH_2NR^2CH_2CH_2NR^3CH_2CH_2CH_2NHR^4 \quad (1)$$

(where, $R^1$ and $R^2$ are represented by the following general formula (2):

[Chem. 2]

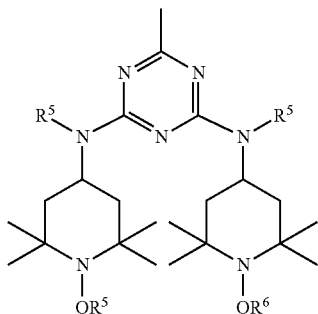

(2)

(where $R^5$ is an alkyl group having 1 to 12 carbon atoms such as methyl group, ethyl group, propyl group, butyl group, n-pentyl group, n-hexyl group, n-heptyl group, nonyl group, decyl group, undecyl group, dodecyl group, isopropyl group, isobutyl group, secondary-butyl group, tertiary-butyl group, 2-ethylbutyl group, isopentyl group, 1-methylpentyl group, 1,3-dimethyl-butyl group, 1-methyl-hexyl group, isoheptyl group, 1,1,3,3-tetramethyl-pentyl group, 1-methyl-undecyl group, or 1,1,3,3,5,5-hexamethyl hexyl group; $R^6$ is methyl group, cyclohexyl group, or octyl group), one of $R^3$ and $R^4$ is a group represented by the general formula (2), and the other one of $R^3$ and $R^4$ represents a hydrogen atom).

The sterically hindered amine ether flame retardant may be used solely, or two or more kinds thereof may be used in combination.

Specific examples of the group represented by the general formula (2) encompass groups derived from 2,4-bis[(1-methoxy-2,2,6,6-tetramethylpiperidin-4-yl)n-butylamino]-s-triazine, 2,4-bis[(1-cyclohexyloxy-2,2,6,6-tetramethylpiperidine-4-yl)n-butylamino]-s-triazine, and 2,4-bis[(1-octyloxy-2,2,6,6-tetramethylpiperidine-4-yl)n-butyl amino]s-triazine.

Specific examples of the sterically hindered amine ether flame retardant represented by the general formula (1) encompass: N,N',N'''-tris{2,4-bis[(1-cyclohexyloxy-2,2,6,6-tetramethylpiperidin-4-yl)n-butylamino]-s-triazin-6-yl}-3,3'-ethylenediiminopropylamine; N,N',N'''-tris{2,4-bis[(1-cyclohexyloxy-2,2,6,6-tetramethylpiperidin-4-yl)n-butylamino]s-triazin-6-yl}-3,3'-ethylenediiminodipropylamine{2,4-bis[(1-octyloxy-2,2,6,6-tetramethylpiperidin-4-yl)n-butylamino]-s-triazin-6-yl}-3,3'-ethylenediiminodipropylamine; N,N',N''-tris{2,4-bis[(1-octyloxy-2,2,6,6-tetramethylpiperidin-4-yl)n-butylamino]-s-triazin-6-yl}-3,3'-ethylenediiminopropylamine; N,N',N''-tris{2,4-bis[(1-methoxy-2,2,6,6-tetramethylpiperidin-4-yl) n-butyl amino]s-triazin-6-yl}-3,3'-ethylenediiminopropylamine; and N,N',N''-tris{2,4-bis[(1-methoxy-2,2,6,6-tetramethylpiperidin-4-yl)n-butylamino]-s-triazin-6-yl}-3,3'-ethylenediiminopropylamine. Those retardants may be used solely, or two or more kinds thereof may be used in combination.

As a blending ratio of the sterically hindered amine ether flame retardant of the present invention to polyolefin resin, the sterically hindered amine ether flame retardant is preferably 0.01 part by weight or more but 0.2 part by weight or less with respect to 100 parts by weight of polyolefin resin particles, and more preferably 0.02 part by weight or more but 0.1 part by weight or less.

If the blending ratio of the sterically hindered amine ether flame retardant is less than 0.01 part by weight, there is a tendency that sufficient flame retardancy cannot be obtained easily, meanwhile, if the blending ratio exceeds 0.2 part by weight, the cost of production of polyolefin resin expanded particles tends to rise and to be economically disadvantageous.

In the present invention, polyolefin resin particles may further contain a benzotriazole ultraviolet absorber, a hindered amine light stabilizer, a phenolic antioxidant, a phosphite processing stabilizer, a sulfur-based heat stabilizers, and the like.

While the benzotriazole ultraviolet absorber is not particularly limited provided that it can be generally used for resin, preferable specific examples thereof encompass: 2-(2-hydroxy-3-t-butyl-5-methylphenyl)-5-chlorobenzotriazole, 2-(2-hydroxy-5-methylphenyl)-benzotriazole, 2-(2-hydroxy-3,5-di-t-butylphenyl)-5-chlorobenzotriazole, 2-(2-hydroxy-3,5-di-t-amylphenyl)-benzotriazole, and 2-(2-hydroxy-5-t-octylphenyl)-benzotriazole. Those absorbers may be used solely, or two or more kinds thereof may be used in combination. Among those, 2-(2-hydroxy-3-t-butyl-5-methylphenyl)-5-chlorobenzotriazole, 2-(2-hydroxy-5-methylphenyl)-benzotriazole, and 2-(2-hydroxy-3,5-di-t-butylphenyl)-5-chlorobenzotriazole are preferable. Those absorbers may be used solely, or two or more kinds thereof may be used in combination.

An amount of benzotriazole ultraviolet absorber used is preferably 0.01 part by weight or more but 1.0 part by weight or less with respect to 100 parts by weight of polyolefin resin, and more preferably 0.1 part by weight or more but 0.5 part by weight or less.

If the amount of benzotriazole ultraviolet absorber used is less than 0.01 part by weight, in some cases, polyolefin resin does not obtain a sufficient flame retardancy improvement effect, meanwhile, if the amount exceeds 1.0 part by weight, the cost of production of polyolefin resin expanded particles rises in some cases, which is economically disadvantageous.

While the hindered amine light stabilizer is not particularly limited provided that it is generally used for resin, preferable specific examples thereof encompass bis(2,2,6,6-tetramethyl-4-piperidyl)sebacate, bis(1,2,2,6,6-pentamethyl-4-piperidyl) sebacate, and poly[[6-[(1,1,3,3-tetramethylbutyl) amino]-1,3,5-triazine-2,4-diyl][(2,2,6,6-tetramethyl-4-piperidyl)imino]]. Those stabilizers may be used solely, or two or more kinds thereof may be used in combination. Among those, bis(2,2,6,6-tetramethyl-4-piperidyl)sebacate is preferable. Those stabilizers may be used solely, or two or more kinds thereof may be used in combination.

An amount of hindered amine light stabilizer used is preferably 0.01 part by weight or more but 1.0 part by weight or less with respect to 100 parts by weight of polyolefin resin, and more preferably 0.1 part by weight or more but 0.5 part by weight or less.

If the amount of hindered amine light stabilizer used is less than 0.01 part by weight, in some cases, polyolefin resin does not obtain a sufficient flame retardancy improvement effect, meanwhile, if the amount exceeds 1.0 part by weight, the cost of production of polyolefin resin expanded particles rises in some cases, which is economically disadvantageous.

While the phenolic antioxidant is not particularly limited provided that it is used for resin, preferable specific examples thereof encompass tetrakis[methylene-3-(3,5-di-t-butyl-4-hydroxyphenyl)propionate]methane, tris(3,5-di-t-butyl-4-hydroxybenzyl)isocyanurate, n-octadecyl-3-(3,5-di-t-butyl-4-hydroxyphenyl)propionate, and 1,1,3-tris(2-methyl-4-hydroxy-5-t-butylphenyl)butane. Those antioxidants may be used solely, or two or more kinds thereof may be used in combination. Among those, tetrakis[methylene-3-(3,5-di-t-butyl-4-hydroxyphenyl)propionate]methane and tris(3,5-di-t-butyl-4-hydroxybenzyl)isocyanurate are preferable. Those antioxidants may be used solely, or two or more kinds thereof may be used in combination.

An amount of phenolic antioxidant used is preferably 0.01 part by weight or more but 1.0 part by weight or less with respect to 100 parts by weight of polyolefin resin, and more preferably 0.1 part by weight or more but 0.5 part by weight or less.

If the amount of phenolic antioxidant used is less than 0.01 part by weight, in some cases, polyolefin resin does not obtain a sufficient flame retardancy improvement effect, meanwhile, if the amount exceeds 1.0 part by weight, the cost of production of polyolefin resin expanded particles rises in some cases, which is economically disadvantageous.

While the phosphite processing stabilizer is not particularly limited provided that it is used for resin, preferable specific examples thereof encompass tris(2,4-di-t-butylphenyl)phosphite, bis(2,4-di-t-butylphenyl)pentaerythritol diphosphite, and tris(mono, di-nonylphenyl)phosphite. Those stabilizers may be used solely, or two or more kinds thereof may be used in combination. Among those, tris(2,4-di-t-butylphenyl)phosphite is preferable.

An amount of phosphite processing stabilizer used is preferably 0.01 part by weight or more but 1.0 part by weight or less with respect to 100 parts by weight of polyolefin resin, and more preferably 0.1 part by weight or more but 0.5 part by weight or less.

If the amount of phosphite processing stabilizer used is less than 0.01 part by weight, in some cases, polyolefin resin does not obtain a sufficient flame retardancy improvement effect, meanwhile, in a case where the amount exceeds 1.0 part by weight, the cost of production of polyolefin resin expanded particles rises in some cases, which is economically disadvantageous.

While the sulfur-based heat stabilizer is not particularly limited provided that it is used for resin, preferable specific examples thereof encompass distearyl thiodipropionate, dilauryl thiodipropionate, dimyristyl thiodipropionate, and ditridecyl thiodipropionate. Those stabilizers may be used solely, or two or more kinds thereof may be used in combination. Among those, distearyl thiodipropionate is preferable.

An amount of sulfur-based heat stabilizer used is preferably 0.01 part by weight or more but 1.0 part by weight or less with respect to 100 parts by weight of polyolefin resin, and more preferably 0.1 part by weight or more but 0.5 part by weight or less.

If the blending ratio of the sulfur-based heat stabilizer is less than 0.01 part by weight, in some cases, polyolefin resin does not obtain a sufficient flame retardancy improvement effect; meanwhile, if the blending ratio exceeds 1.0 part by weight, the cost of production of polyolefin resin expanded particles rises in some cases, which is economically disadvantageous.

The "flame retardancy" in the present invention is determined by testing a polyolefin resin in-mold expanding molded product made from polyolefin resin expanded particles on the basis of a flammability test method defined in FMVSS302. In an evaluation by the test method described below, the "flame retardancy" indicates preferably slow-burning or self-extinguishment, and more preferably self-extinguishment.

Polyolefin resin particles for use in the present invention is produced by (I) melting and kneading (i) polyolefin resin, (ii) a phosphorous flame retardant having the phosphorous content of 7% by weight or more, the melting point of 120° C. or more, and the 5% by weight decomposition temperature of 240° C. to 320° C., (iii) carbon black masterbatch, and (iv) another additive such as a sterically hindered amine ether flame retardant with use of an extruder, a kneader, a Banbury mixer, a roller, or the like, and (II) processing the mixture to form polyolefin resin particles having a shape of a cylinder, an ellipse, a sphere, a cube, a rectangular parallelepiped, or the like.

Note that the phosphorous flame retardant and the sterically hindered amine ether flame retardant may be also melted and kneaded as a masterbatch produced by dispersing the phosphorous flame retardant and the sterically hindered amine ether flame retardant in polyolefin resin.

In order to prepare polyolefin resin expanded particles of the present invention to have an appropriate average maximum diameter, a weight of a single particle is preferably 0.1 mg or more but 30 mg or less, and more preferably 0.3 mg or more but 10 mg or less.

Note that a weight of a single polyolefin resin particle is an average resin particle weight of one hundred particles selected at random from polyolefin resin particles.

In the present invention, a cell nucleating agent such as talc; stabilizers such as antioxidants, metal deactivators, phosphorous processing stabilizers, ultraviolet absorbers, ultraviolet stabilizers, fluorescent brightening agents, and metallic soaps; crosslinkers; chain transfer agents; lubricants; elasticizers; fillers; reinforcements; other flame retardants; surfactant-type or high-molecule-type antistatic agents; or conductivity improving agents may be added to polyolefin resin particles, as necessary, provided that this addition does not reduce effects of the present invention.

Polyolefin resin expanded particles of the present invention can be produced by, for example, (i) dispersing polyolefin resin particles in a dispersion medium in a closed vessel, (ii) heating the polyolefin resin particles to a softening temperature or more of the polyolefin resin particles in the presence of an expanding agent, and (iii) discharging the polyolefin resin particles together with the dispersion medium to an atmosphere whose pressure is less than a pressure in the closed vessel, thereby expanding the polyolefin resin particles. A heating temperature in the closed vessel is preferably a temperature within a range of +/−25° C. from a melting point of polyolefin resin particles, and more preferably a temperature within a range of +/−15° C. from the melting point of the polyolefin resin particles. It is possible to produce polyolefin resin expanded particles by heating polyolefin resin particles to the above temperature, pressurizing the polyolefin resin particles, impregnating expanding agent with polyolefin resin particles, and opening one end of the closed vessel to discharge the polyolefin resin particles into an atmosphere whose pressure is less than that in the closed vessel.

The closed vessel for use in dispersion of polyolefin resin particles is not particularly limited provided that it can endure an internal pressure and an internal temperature at the time of production of polyolefin resin expanded particles, and, for example, is an autoclave-type vessel.

Examples of the dispersion medium encompass methanol, ethanol, ethylene glycol, glycerin, and water, and, particularly, water is preferably used.

In the dispersion medium, a dispersion agent is preferably used to prevent coherence between polyolefin resin particles. Examples of the dispersion agent encompass inorganic dispersion agents such as tribasic calcium phosphate, magnesium phosphate, basic magnesium carbonate, calcium carbonate, barium sulfate, kaolin, talc, and clay. Further, as necessary, the dispersion agent is preferably used in combination with, for example, dispersion auxiliary agents such as sodium dodecylbenzenesulfonate, sodium n-paraffin sulfonate, sodium α-olefin sulfonate, magnesium sulfate, magnesium nitrate, magnesium chloride, aluminum sulfate, aluminum nitrate, aluminum chloride, iron sulfate, iron nitrate, and iron chloride.

Among those, it is more preferable that tribasic calcium phosphate be used with n-paraffin sulfonate sodium.

While the amounts of dispersion agent and dispersion auxiliary agent used differ depending on the kind thereof and the kind and amount of polyolefin resin used, it is usually preferable that 0.2 part by weight or more but 3 parts by weight or less of dispersion agent and 0.001 part by weight or more but 0.1 part by weight or less of dispersion auxiliary agent be blended with 100 parts by weight of dispersion medium. In order to obtain favorable dispersibility in a dispersion medium, it is usually preferable that 20 parts by weight or more but 100 parts by weight or less of polyolefin resin particles be used with respect to 100 parts by weight of dispersion medium.

In the present invention, an expanding agent for preparing polyolefin resin expanded particles is not particularly limited, and examples of the expanding agent encompass aliphatic hydrocarbons such as propane, isobutane, normal butane, isopentane, and normal pentane; inorganic gases such as air, nitrogen, and carbon dioxide; water; and mixtures thereof.

In a case where water is used as the expanding agent, at least one of a compound containing a hydrophilic polymer, a compound containing polyhydric alcohol, and a compound containing a triazine skeleton is preferably added to polyolefin resin particles in order to produce polyolefin resin expanded particles having a high expanding ratio.

Here, examples of hydrophilic polymer encompass: carboxyl group containing polymers such as ethylene-acrylic acid-maleic anhydride terpolymer, ethylene-(meth)acrylic acid copolymer, ionomer resin in which ethylene-(meth)acrylic acid copolymers are crosslinked by metal ions; and polyethylene glycol.

Those polymers may be used solely or one or more thereof may be used in combination.

While an amount of hydrophilic polymer used differs depending on the kind thereof and is not particularly limited, 0.01 part by weight or more but 20 parts by weight or less of hydrophilic polymer is usually preferably used with respect to 100 parts by weight of polyolefin resin particles, and more preferably 0.1 part by weight or more but 5 parts by weight or less.

If the amount of hydrophilic polymer used is less than 0.01 part by weight, there is a tendency that polyolefin resin expanded particles having a high expanding ratio cannot be obtained easily, meanwhile, if the amount exceeds 20 parts by weight, heat resistance and a mechanical strength may be extremely reduced.

Examples of polyhydric alcohol encompass ethylene glycol, glycerol, erythritol, and pentaerythritol. Those polyhydric alcohols may be used solely or one or more thereof may be used in combination.

The compound having the triazine skeleton is preferably a compound having a molecular weight of 300 or less per unit triazine skeleton.

Here, the molecular weight per unit triazine skeleton indicates a value obtained by dividing a molecular weight by the number of triazine skeletons included in a single molecule.

If the molecular weight per unit triazine skeleton exceeds 300, an expanding ratio variation and a cell diameter variation may become remarkable.

Examples of compound having the molecular weight per unit triazine skeleton of 300 or less encompass melamine (chemical name: 1,3,5-triazine-2,4,6-triamine), ammeline (chemical name: 1,3,5-triazine-2-hydroxy-4,6-diamine), ammelide (chemical name: 1,3,5-triazine-2,4-hydroxy-6-amine), cyanuric acid (chemical name: 1,3,5-triazine-2,4,6-triol), tris(methyl)cyanurate, tris(ethyl)cyanurate, tris(butyl)cyanurate, tris(2-hydroxyethyl)cyanurate, and melamine-isocyanuric acid condensation product.

Those compounds may be used solely or one or more thereof may be used in combination.

Among those, melamine, isocyanuric acid, and melamine-isocyanuric acid condensation product are preferably used so that polyolefin resin expanded particles having a high expanding ratio can obtain small expanding ratio variation and small cell diameter variation.

In a case where carbon dioxide is used as the expanding agent, there is a tendency that, when low molecular weight hydrophilic materials, such as glycerol and polyethylene glycol having a molecular weight of 300 or less, and zinc borate, are added to polyolefin resin, polyolefin resin expanded particles can obtain a high expanding ratio and a uniform cell diameter.

The expanding ratio of polyolefin resin expanded particles which can be produced by the above production method is preferably 5 times or more but 50 times or less, and more preferably 7 times or more but 45 times or less.

Further, polyolefin resin expanded particles having a higher expanding ratio may be produced by, for example, the following two-stage expanding method: polyolefin resin expanded particles having an expanding ratio of 5 times or more but 35 times or less are produced once; a pressurizing process in which the polyolefin resin expanded particles are introduced into a closed vessel and are impregnated with nitrogen, air, or the like is carried out to thereby increase a pressure in the polyolefin resin expanded particles higher than a normal pressure; and the polyolefin resin expanded particles are heated by steam or the like, thereby expanding further.

The expanding ratio is a ratio obtained by measuring a weight w (g) and an ethanol submerged volume v (cm$^3$) of polyolefin resin expanded particles and calculating the following equation based on a density d (g/cm$^3$) of polyolefin resin particles before being expanded.

$$\text{Expanding ratio} = d \times v / w$$

Upon measuring polyolefin resin expanded particles of the present invention by the differential scanning calorimeter method, a DSC curve obtained when 5 mg to 6 mg of polyolefin resin expanded particles are heated from 40° C. to 220° C. at a heating rate of 10° C./min preferably has two melting peaks. When tangent lines are drew from a point at which heat is absorbed in the smallest amount between the two melting peaks in the DSC curve to the DSC curve, a part defined by the tangent line and the DSC curve on a low-temperature side has a low-temperature-side melting peak heat quantity Ql, and a part defined by the tangent line and the DSC curve on a high-temperature side has a high-temperature-side melting peak heat quantity Qh. A ratio of the melting peak on the high-temperature side (Qh/(Ql+Qh)×100 (hereinafter, abbreviated as "DSC ratio")), which is calculated from the above, is preferably 13% or more but 50% or less, and more preferably 18% or more but 40% or less.

In a case where the DSC ratio falls within the above ratio, a polyolefin resin in-mold expanding molded product has a beautiful surface.

In a case where polyolefin resin expanded particles of the present invention is used for in-mold expanding molding, the following known methods can be employed.

A) a method using polyolefin resin expanded particles as they are,

B) a method in which an inorganic gas such as air is injected to expanded particles in advance to impart an expandability, C) a method in which the particles are introduced into a mold in a state of being pressurized and then expanded particles are molded.

In the method in which an inorganic gas such as air is injected to expanded particles in advance to apply an expandability (hereinafter, abbreviated as "internal pressure imparting method" in some cases) in the present invention, 3.0 atm or less of internal pressure is preferably imparted to the polyolefin resin expanded particles, and more preferably 1.3 atm or more but 3.0 atm or less of internal pressure is imparted, and further preferably 1.5 atm or more but 2.5 atm or less of internal pressure is imparted.

If the imparted internal pressure exceeds 3.0 atm, it takes long time for imparting an internal pressure in a pressure vessel and for cooling expanded particles at the time of in-mold molding, which lengthens a molding cycle. Therefore, productivity tends to be decreased. Meanwhile, if the imparted internal pressure is less than 1.3 atm, there is a tendency that (A) particles have gaps therebetween on a surface of a molded product after being in-mold molded, which results in generation of unevenness on the surface, (B) the molded product is shrunk, which results in generation of wrinkles on the surface, and/or (C) in a case where an in-mold molded product has a rib, a filling property of the expanded particles tends to be deteriorated, and therefore voids tend to be generated.

As a method of imparting an internal pressure to polyolefin resin expanded particles, for example, polyolefin resin expanded particles are introduced into a pressure-resistant vessel and a pressurizing process is carried out with use of an inorganic gas. In this case, the polyolefin resin expanded particles may be heated as necessary.

Here, the pressure-resistant vessel is not particularly limited, and is, for example, an autoclave-type pressure-resistant vessel.

While examples of the inorganic gas encompass air, nitrogen, argon, and helium, air and nitrogen are preferable in terms of cost.

A specific method of in-mold expanding molding polyolefin resin expanded particles of the present invention to produce a polyolefin resin in-mold expanding molded product is, for example, a method involving (i) pressurizing air in polyolefin resin expanded particles in a pressure-resistant vessel in advance, (ii) injecting air to the polyolefin resin expanded particles to impart expandability; (iii) introducing the polyolefin resin expanded particles into a molding space consist of two molds which are closable but cannot seal the molding space; (iv) molding the polyolefin resin expanded particles with use of steam or the like as a heating medium at a heating steam pressure of about 0.10 MPa to 0.4 MPa for a heating time of 3 seconds to 30 seconds to fuse the polyolefin resin expanded particles; (v) cooling the two molds with water; and (vi) opening the two molds, whereby a polyolefin resin in-mold expanding molded product can be obtained.

A polyolefin resin in-mold expanding molded product made from polyolefin resin expanded particles of the present invention has a density of preferably 10 kg/m$^3$ or more 300 kg/m$^3$ or less, more preferably 15 kg/m$^3$ or more but 250 kg/m$^3$ or less, and further preferably 15 kg/m$^3$ or more but 25 kg/m$^3$ or less. In particular, in a case where the density of the polyolefin resin in-mold expanding molded product is 15 kg/m$^3$ or more but 25 kg/m$^3$ or less, flame retardancy is remarkably improved.

The present invention can be also constituted as follows.

As a preferable embodiment, the present invention relates to the polyolefin resin expanded particles containing (1) triphenylphosphine oxide or 2-diphenyl phosphinyl hydroquinone as a phosphorous flame retardant whose phosphorous content is 7% by weight or more, melting point is 120° C. or more, 5% by weight decomposition temperature falls within a range of 240° C. to 320° C., (2) carbon black having a particle diameter of 20 nm to 100 nm in the polyolefin resin expanded particles, (3) 0.01 part by weight to 0.2 part by weight of sterically hindered amine ether flame retardant as another flame retardant, and (4) polyolefin resin which is polypropylene.

The present invention thirdly relates to an in-mold expanding molded product made from the polyolefin resin expanded particles containing carbon black.

EXAMPLES

The following description will discuss the present invention with reference to Examples and Comparative Examples, however, the present invention is not limited to those examples.

In Examples and Comparative Examples, resin and compounds used are shown as follows.

Polypropylene resin [ethylene-propylene random copolymer, ethylene content: 2.1%, MFR=7.1 g/10 minutes, melting point: 143° C.]

Phosphorous flame retardant whose phosphorous content is 7% by weight or more, melting point is 120° C. or more, and 5% by weight decomposition temperature falls within the range of 240° C. to 320° C.:

triphenyl phosphine oxide [manufactured by K.I Chemical Industry Co., Ltd., PP-560; melting point=156° C., 5% by weight decomposition temperature=254° C., phosphorous content; 11.13%]

2-diphenyl phosphinyl hydroquinone [manufactured by HOKKO SANGYO Co., LTD., PPQ; melting point=214° C., 5% by weight decomposition temperature=304° C., phosphorous content: 9.98%]

Carbon black:

carbon blacks A and B were used as carbon black masterbatches containing 5% by weight of the carbon blacks A, B, respectively, in polypropylene resin (MFR=15 g/10 minutes). Note that Table 1 shows average diameters of particles of carbon black in the resultant expanded particles.

Sterically hindered amine ether flame retardant:
NOR116 manufactured by Chiba Specialty Chemicals Inc.
Note that NOR116 is a reaction product obtained by reacting
a reaction product of N-butyl-2,2,6,6-tetramethyl-4-piperidinamine which has been subjected to peroxide processing and 2,4,6-trichloro-1,3,5-triazine with cyclohexane and reacting the resultant product with N,N-bis(3-aminopropyl)ethylenediamine, and is a compound containing a substance represented by the following chemical formula (3).

[Chem. 3]

(3)

(where R is a group represented by the following formula:

[Chem. 4]

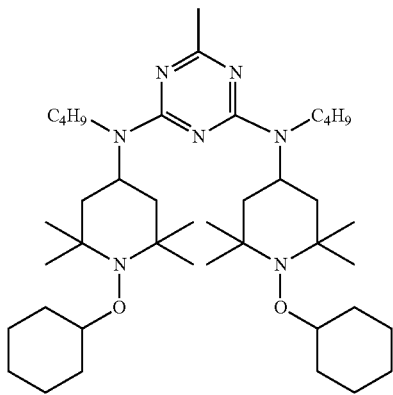

Another phosphorous flame retardant:
triphenyl phosphate [manufactured by Ajinomoto Fine-Techno Co., Inc., REOFOS TPP; melting point=49° C., 5% by weight decomposition start temperature=224° C., phosphorous content=9.49%]
Melamine polyphosphate [manufactured by SANWA Chemical Co., Ltd, M-PPB; 5% by weight decomposition start temperature=350° C., phosphorous content=15%]
Nucleating agent:
Talc [manufactured by Hayashi-Kasei Co., Ltd., Talcan Powder PK-S]
Hydrophilic polymer:
Polyethylene glycol [manufactured by Lion Corporation, PEG #300]
Examples and Comparative Examples were evaluated as below.
(Particle Diameter of Carbon Black)
A cross-section of a cell film of the resultant polyolefin resin expanded particles was magnified 40,000 times with use of a transmission electron microscope and a picture of the cross-section was taken. In the picture taken with use of the transmission electron microscope, and particle diameters (Feret diameters) of arbitrary 50 carbon black particles in X and Y directions were measured, and an average value thereof was calculated, and a value thus calculated was defined as a particle diameter of carbon black.
(Flame Retardancy)
A flammability test sample having length 350 mm×width 100 mm×thickness 12 mm was cut out from the resultant expanded product, and an A line was marked at a position of 38 mm from an end of the sample in a length direction, whereas a B line was marked at a position of 292 mm from the end. Flame retardancy was evaluated in accordance with the flammability test method defined in FMVSS302. The end of the sample in the length direction was exposed to flame of a burner whose height was adjusted to 38 mm for 15 seconds so that the end was set to be a center of the flame with use of an FMVSS flammability tester [manufactured by Suga Test Instruments Co., Ltd.], and the flame retardancy of the sample was evaluated on the basis of the following criteria according to how the sample was burned.
E (Excellent): The sample was extinguished before the flame reached the A line, or was extinguished within 60 seconds or 50 mm after the flame reached A line. The sample has "self-extinguishment".
G (Good): A burning rate of the sample was 100 mm/minute or less in a case where the sample was flamed after the flame reached the A line [38 mm from the end of the sample which was exposed to flame] and the flame of the sample reached the B line [292 mm from the end of the sample which was exposed to flame], or
a burning rate of the sample was 100 mm/minute or less in a case where flame was extinguished beyond 60 seconds or 50 mm after the flame reached the A line. Those samples have "slow-burning".
P (Poor): The sample was determined to have neither self-extinguishment nor slow-burning. The sample has "flammability".
(Degree of Black)
A surface of the resultant in-mold expanding molded product was visually observed, and was evaluated on the basis of the following criteria.
E (Excellent): high degree of black
G (Good): black
A (Acceptable): slightly pale
P (Poor): pale
(Expanding Ratio)
The expanding ratio was obtained by measuring the weight w (g) and ethanol submerged volume v ($cm^3$) of polyolefin resin expanded particles and calculating the following equation on the basis of a density d ($g/cm^3$) of polyolefin resin particles before being expanded.

Expanding ratio=$d \times v/w$ (Average Cell Diameter)
Thirty expanded particles of the resultant polyolefin resin expanded particles were arbitrarily picked up, and cell diameters thereof were measured in conformity with JIS K6402, whereby an average cell diameter was obtained.
(Closed Cell Ratio)
A closed cell ratio was obtained by measuring a closed cell volume of the resultant expanded particles with use of an air comparison hydrometer (manufactured by BECKMAN, Type: 930), and dividing the closed cell volume by an apparent volume measured by an ethanol immersion method.
(DSC Ratio)
When 5 mg to 6 mg of the resultant polyolefin resin expanded particles was heated from 40° C. to 220° C. at a heating rate of 10° C./min with use of a differential scanning calorimeter [manufactured by Seiko Instruments Inc., DSC6200R], a DSC curve (exemplified in FIG. 1) was obtained. The DSC curve thus obtained has two peaks, and the DSC ratio was obtained by calculating the following equation on the basis of the low-temperature-side melting peak heat quantity Ql and the high-temperature-side melting peak heat quantity Qh of those two melting peaks.

DSC ratio=$Qh/(Ql+Qh) \times 100$ (Molded Product Density)

A weight w (g) of the flame retardancy test sample for use in evaluation was measured, and a volume v (L) of the flame retardancy test sample was calculated on the basis of length, width, and thickness of the flame retardancy test sample. A molded product density was calculated by the following equation.

$$\text{Molded product density} = w/v$$

(Surface Appearance of Plate-Like Molded Product)

A surface of the resultant in-mold expanding molded product was visually observed, and was evaluated on the basis of the following criteria.

G (Good): The surface is not uneven and there are almost no gaps between particles.

P (Poor): The surface is uneven and gaps between particles are extremely large.

(Fusion Ratio of Plate-Like Molded Product)

The resultant in-mold expanding molded product was broken, and a cross-section thereof was observed. A ratio of the number of broken particles to all particles on the cross-section was calculated, and a fusion ratio was evaluated on the basis of the following criteria.

G (Good): Not less than 60% of particles are broken.

P (Poor): Less than 60% of particles are broken.

(Surface Appearance of Box-Type Molded Product Having Rib)

A surface of an in-mold expanding molded product produced by using a box-type mold having a rib was visually observed, and was evaluated on the basis of the following criteria.

G (Good): Unevenness or wrinkle is not generated on the surface of the box-type molded product including a surface of the rib section, and there are few gaps between particles.

A (Acceptable): Unevenness or wrinkle is slightly generated on the surface of the box-type molded product including the surface of the rib section, and there are some gaps between particles.

P (Poor): Unevenness and wrinkles are generated on the surface of the box-type molded product including the surface of the rib section, and the gaps between particles are extremely large Examples 1 to 9

Preparation of Polyolefin Resin Particles

To 100 parts by weight of polypropylene resin, 0.5 part by weight of polyethylene glycol was pre-blended. Then 0.05 part by weight of talc serving as a nucleating agent, triphenyl phosphine oxide, 2-diphenyl phosphinyl hydroquinone, and sterically hindered amine ether serving as flame retardants, and carbon black A and carbon black B serving as coloring agents were added in amounts shown in Table 1, and the resultant was mixed.

The resultant mixture was supplied to an extruder, was melted and kneaded at a resin temperature of 210° C., and was extruded with use of a cylindrical die (diameter of 1.8 mm) which was provided at the end of the extruder, then was cooled with water and cut by a cutter, whereby cylindrical polypropylene resin particles (1.2 mg/particle) were obtained.

[Preparation of Polyolefin Resin Expanded Particles]

To a 200-L closed vessel, 100 parts by weight of the resultant polypropylene resin particles, 200 parts by weight of pure water, 0.6 part by weight of tribasic calcium phosphate, and 0.04 part by weight of sodium n-paraffin sulfonate were poured and deaerated, and 7 parts by weight of carbon dioxide was poured to the closed vessel under stirring. Then the resultant was heated to 150° C. A pressure in the closed vessel at this time was 2.9 MPa (gauge pressure). Immediately, by opening a valve provided at a lower part of the closed vessel, an aqueous dispersion (resin particles and water-based dispersion medium) was discharged through an orifice having a diameter of 3.5 mm into an atmospheric pressure, whereby the expanded particles were obtained. In this case, the pressure was kept by carbon dioxide to prevent the pressure from reducing during the discharge of the aqueous dispersion.

The resultant expanded particles were evaluated in terms of expanding ratio, average cell diameter, closed cell ratio, and DSC ratio. The results are shown in Table 1.

[Preparation of Polyolefin in-Mold Expanding Molded Product (Plate Shape)]

A plate-like polypropylene resin in-mold expanding molded product was obtained with use of a polyolefin expanding molding apparatus P150N (manufactured by Toyo Machinery & Metal Co., Ltd.) as follows: polypropylene resin expanded particles to which 2.0 atm of internal pressure was imparted by air pressurization in a pressure-resistant vessel were introduced into a plate-shaped mold (length 400 mm×width 300 mm×thickness 12 mm); and the expanded particles were heated to be fused with steam having a pressure of (gauge pressure) 0.28 MPa for 10 seconds.

The resultant plate-like in-mold expanding molded product was evaluated in terms of molded product density, surface appearance, fusing ratio, flame retardancy, and the degree of black. The results are shown in Table 1.

[Preparation of Polyolefin in-Mold Expanding Molded Product (Box-Type Molded Product Having Rib)]

In order to evaluate moldability of expanded particles when the internal pressure was changed, box-type in-mold expanding molded products having a rib were made from polypropylene resin expanded particles having different internal pressures.

Figure 2:
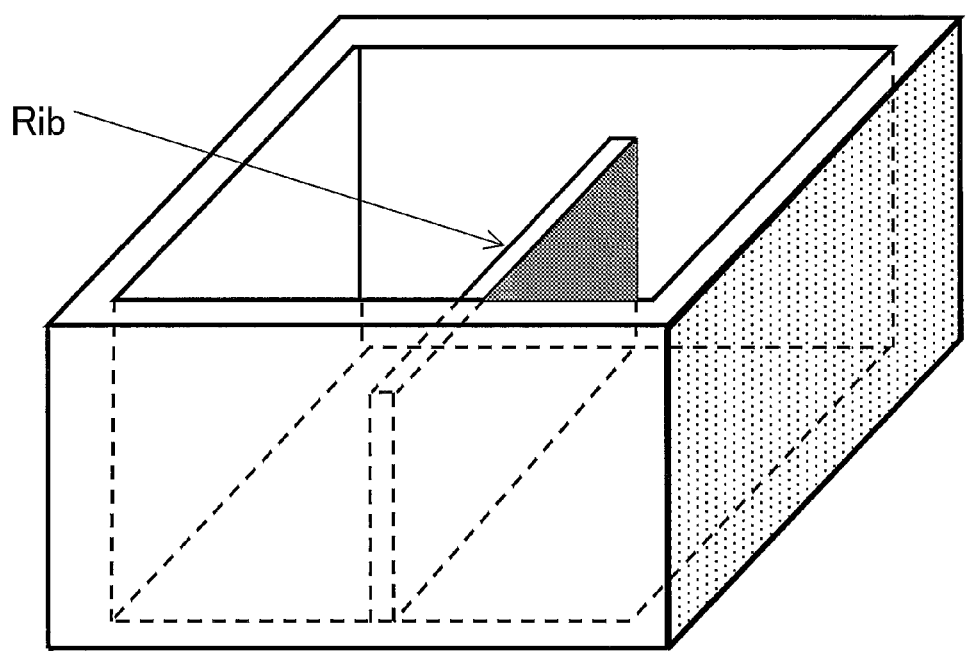
FIG. 2 is a perspective view of a mold for box-type molded products, which has a rib and is used in Examples of the present invention.

First, prepared was the resultant expanded particles to which 1.5 atm, 2.0 atm, or 2.5 atm of the internal pressure had been imparted by air pressurization in the pressure-resistant vessel. Polypropylene resin in-mold expanding molded products were produced with use of the polyolefin expanding molding apparatus P150N (manufactured by Toyo Machinery & Metal Co., Ltd.) as follows: (i) polypropylene resin expanded particles at three different levels of an internal pressure were introduced into respective molds for box-type-molded-product having a rib shown in FIG. 2 and (ii) the expanded particles were heated to be fused with steam having a pressure of (gauge pressure) 0.28 MPa for 10 seconds.

Note that molds for the box-type-molded-product has an outer dimension of length 200 mm×width 210 mm×height 150 mm and a thickness of 15 mm uniformly. A rib is located in a center of a bottom of the box-type in-mold expanding molded product in the width direction, and the rib has an outer dimension of length 170 mm×width 7 mm×height 120 mm.

The resultant in-mold expanding molded products were evaluated in terms of surface appearance. The results were shown in Table 1.

TABLE 1

|  |  |  | Examples | | | | | | | | | |
|---|---|---|---|---|---|---|---|---|---|---|---|---|
|  |  |  | 1 | 2 | 3 | 4 | 5 | 6 | 7 | 8 | 9 |
| Polypropylene resin | | part by weight | 100 | 100 | 100 | 100 | 100 | 100 | 100 | 100 | 100 |
| Triphenylphosphine oxide | | part by weight | 2.0 | 0.05 | 1.0 | 2.0 | 2.0 | 0.05 | 1.0 | | |
| 2-diphenyl phosphinyl hydroquinone | | part by weight | | | | | | | | 1.0 | 1.0 |
| Triphenyl phosphate | | part by weight | | | | | | | | | |
| Melamine polyphosphate | | part by weight | | | | | | | | | |
| Sterically hindered amine ether flame retardant | | part by weight | | 0.04 | 0.04 | | | 0.04 | 0.04 | | 0.04 |
| Carbon black A (particle diameter of 90 nm) | | part by weight | 3.5 | 3.5 | 3.5 | | | | | | |
| Carbon black B (particle diameter of 130 nm) | | part by weight | | | | 3.5 | 6.0 | 6.0 | 6.0 | 6.0 | 6.0 |
| Polyethylene glycol | | part by weight | 0.5 | 0.5 | 0.5 | 0.5 | 0.5 | 0.5 | 0.5 | 0.5 | 0.5 |
| Talc | | part by weight | 0.05 | 0.05 | 0.05 | 0.05 | 0.05 | 0.05 | 0.05 | 0.05 | 0.05 |
| Expanded particle | Expanding ratio | time | 19.4 | 19.6 | 21.7 | 21.2 | 21.1 | 20.7 | 19.7 | 20.1 | 21.1 |
|  | Average cell diameter | μm | 201 | 186 | 188 | 195 | 180 | 169 | 171 | 161 | 159 |
|  | Closed cell ratio | % | 98.3 | 97.5 | 98.1 | 99.0 | 98.1 | 97.5 | 97.1 | 97.2 | 97.9 |
| Plate-like Molded product | Molded product density | g/L | 31.2 | 32.6 | 29.6 | 30.5 | 30.7 | 31.9 | 31.3 | 31.4 | 29.9 |
|  | Surface appearance | | G | G | G | G | G | G | G | G | G |
|  | Degree of black | | E | E | E | G | E | G | G | G | G |
|  | Fusion ratio | | G | G | G | G | G | G | G | G | G |
|  | Flame retardancy | Number of extinguishments | in 10 samples | 3 | 7 | 10 | 10 | 7 | 7 | 10 | 1 | 4 |
|  |  | Burning rate | mm/minute | 67 | 70 | — | — | 70 | 70 | — | 79 | 75 |
|  |  | Flame retardancy evaluation | | G | G | E | E | G | G | E | G | G |
| Box-type in-mold expanding molded product having rib | Surface appearance | Expanded particle internal pressure 1.5 atm | G | G | G | G | G | G | G | G | G |
|  |  | Expanded particle internal pressure 2.0 atm | G | G | G | G | G | G | G | G | G |
|  |  | Expanded particle internal pressure 2.5 atm | G | G | G | G | G | G | G | G | G |
| Over-all evaluation | | | G | G | G | G | G | G | G | G | G |

Abbreviations
E stands for excellent, G stands for good, A stands for acceptable, and P stands for poor.

Comparative Examples 1 to 6

In the above [Preparation of Polyolefin Resin Particles], polyolefin resin expanded particles and polyolefin in-mold expanded products were produced in the same way as Examples except that the kind and amount of flame retardant and the kind and amount of coloring agent were changed as shown in Table 2.

Evaluation of the resultant expanded particles and the in-mold expanding molded products was shown in Table 2.

TABLE 2

|  |  |  | Comparative Examples | | | | | |
|---|---|---|---|---|---|---|---|---|
|  |  |  | 1 | 2 | 3 | 4 | 5 | 6 |
| Polypropylene resin | | part by weight | 100 | 100 | 100 | 100 | 100 | 100 |
| Triphenylphosphine oxide | | part by weight | 0.02 | 7.0 | 3.0 | | | |
| 2-diphenyl phosphinyl hydroquinone | | part by weight | | | | | | |
| Triphenyl phosphate | | part by weight | | | | 2.0 | | |
| Melamine polyphosphate | | part by weight | | | | | 2.0 | |
| Sterically hindered amine ether flame retardant | | part by weight | | | 0.04 | | | |
| Carbon black A (particle diameter of 90 nm) | | part by weight | 3.5 | 3.5 | 22 | | | |
| Carbon black B (particle diameter of 130 nm) | | part by weight | | | | 6.0 | 6.0 | 6.0 |
| Polyethylene glycol | | part by weight | 0.5 | 0.5 | 0.5 | 0.5 | 0.5 | 0.5 |
| Talc | | part by weight | 0.05 | 0.05 | 0.05 | 0.05 | 0.05 | 0.05 |
| Expanded particle | Expanding ratio | time | 21.3 | 20.9 | 21.2 | 19.9 | 21.0 | 19.6 |
|  | Average cell diameter | μm | 198 | 186 | 113 | 203 | 145 | 194 |
|  | Closed cell ratio | % | 97.1 | 96.1 | 94.5 | 91.1 | 96.3 | 93.1 |
| Molded product | Molded product density | g/L | 29.7 | 30.4 | 30.7 | 31.0 | 29.9 | 31.3 |
|  | Surface appearance | | G | P | P | P | G | G |
|  | Degree of black | | E | G | E | A | A | G |
|  | Fusion ratio | | G | G | G | P | G | G |
|  | Flame retardancy | Number of extinguishments | in 10 samples | 0 | 7 | 0 | 0 | 0 | 1 |
|  |  | Burning rate | mm/min | 101 | 67 | 131 | 102 | 111 | 93 |
|  |  | Flame retardancy evaluation | | P | G | P | P | P | A |
| Box-type in-mold expanding molded product having rib | Surface appearance | Expanded particle internal pressure 1.5 atm | P | P | P | P | P | P |
|  |  | Expanded particle internal pressure 2.0 atm | G | A | A | A | A | G |
|  |  | Expanded particle internal pressure 2.5 atm | A | P | A | P | P | A |
| Over-all evaluation | | | P | P | P | P | P | P |

Abbreviations
E stands for excellent, G stands for good, A stands for acceptable, and P stands for poor.

Each of the resultant plate-like molded products produced in Examples 1 to 3 had a few gaps between particles on its surface, a few wrinkles, and a favorable surface appearance. The degree of black was high, and fusability was also favorable. As a result of the FMVSS flammability test, the resultant plate-like molded products had slow-burning or self-extinguishment, and therefore were sufficient molded products in the over-all evaluation. Further, the box-type molded product having a rib had a beautiful surface in a case where expanded particles to which the internal pressure of 1.5 atm, 2.0 atm, or 2.5 atm had been imparted were used.

On the contrary, in a case where triphenyl phosphine oxide was added in an extremely small amount in Comparative Example 1, a burning rate was fast, i.e., 101 mm/minute, the flame retardancy was not enough, and the box-type molded product having a rib had an inferior surface when the expanded particles internal pressure was 1.5 atm. Further, in a case where 7 parts by weight of triphenyl phosphine oxide was contained in Comparative Example 2, a plate-like molded product and a box-type molded product having a rib were molded products both having inferior surface appearance. In a molded product to which a large amount of carbon black A was added in Comparative Example 3, 3 parts by weight of triphenyl phosphine oxide and 0.04 part by weight of sterically hindered amine ether were added, however, the plate-like molded product and the box-type molded product having a rib both had bad surface appearance and bad flame retardancy.

In a case where the carbon black B was used in Examples 4 to 9, the degree of black with respect to the number of parts added is slightly lower in a case of the carbon black B than a case of the carbon black A, however, the degree of black in a case of the carbon black B is good enough, and, by using triphenyl phosphine oxide or triphenyl phosphine oxide with a sterically hindered amine ether, a molded product having sufficient flame retardancy and sufficient surface could be obtained.

Even in a case where the additive was changed to 2-diphenyl phosphinyl hydroquinone in Examples 8 and 9, the surface appearance, the degree of black, the fusing ratio, and the flame retardancy were sufficient.

In Comparative Examples 4 and 5, the additive was changed to triphenyl phosphate or melamine polyphosphate instead of triphenyl phosphine oxide, the resultant molded products were inferior in flame retardancy and in degree of black. Further, the resultant molded products were also a plate-like molded product and a box-type molded product having a rib which both have inferior surface appearance.

INDUSTRIAL APPLICABILITY

An in-mold expanding molded product obtained by in-mold expanding molding polyolefin resin expanded particles of the present invention has favorable flame retardancy, and has favorable surface appearance even if an imparted internal pressure of the expanded particles for use in in-mold molding is changed. Therefore, the in-mold expanding molded product can be used for building materials or automobile parts, for example.

The invention claimed is:

1. Polyolefin resin expanded particles, obtainable by expanding polyolefin resin particles which contains, with respect to 100 parts by weight of polyolefin resin, (i) 0.03 part by weight to 5 parts by weight of a phosphorous flame retardant having a phosphorous content of 7% by weight or more, a melting point of 120° C. or more, and a 5% by weight decomposition temperature within a range of 240° C. to 320° C. and (ii) 0.5 part by weight to 20 parts by weight of carbon black.

2. Polyolefin resin expanded particles as set forth in claim 1,
wherein the phosphorous flame retardant having the phosphorous content of 7% by weight or more, the melting point of 120° C. or more, and the 5% by weight decomposition temperature within the range of 240° C. to 320° C. is a triphenyl phosphine oxide or 2-diphenyl phosphinyl hydroquinone.

3. Polyolefin resin expanded particles as set forth in claim 1,
wherein diameters of particles of the carbon black in the polyolefin resin expanded particles fall within a range of 20 nm to 100 nm.

4. Polyolefin resin expanded particles as set forth in claim 1,
wherein the polyolefin resin expanded particles contain 0.01 part by weight to 0.2 part by weight of a sterically hindered amine ether flame retardant as another flame retardant.

5. Polyolefin resin expanded particles as set forth in claim 1,
wherein the polyolefin resin is polypropylene.

6. An in-mold expanding molded product comprising polyolefin resin expanded particles as set forth in claim 1,
the polyolefin resin expanded particles being in-mold expanding molded to produce the in-mold expanding molded product.

7. A method of producing polyolefin resin expanded particles, comprising the steps of:
dispersing polyolefin resin particles in a dispersion medium inside a closed vessel,
heating the polyolefin resin particles to a temperature equal to or higher than a softening temperature of the polyolefin resin particles in the presence of expanding agent; and
expanding the polyolefin resin particles by discharging the polyolefin resin particles together with the dispersion medium to an atmosphere having a pressure of less than a pressure in the closed vessel,
the polyolefin resin particles containing, (i) 0.03 part by weight to 5 parts by weight of a phosphorous flame retardant having a phosphorous content of 7% by weight or more, a melting point of 120° C. or more, and a 5% by weight decomposition temperature within a range of 240° C. to 320° C. and (ii) 0.5 part by weight to 20 parts by weight of carbon black.

* * * * *